United States Patent [19]

Terasaki et al.

[11] Patent Number: 4,816,338
[45] Date of Patent: Mar. 28, 1989

[54] GLASSY CARBON-COATED ARTICLE

[75] Inventors: Ryuichi Terasaki, Kawasaki; Shinsei Sato, Yamato; Yoichi Ogata, Hiratsuka; Kazumi Nozawa, Machida; Yukihiko Nakajima, Omuta, all of Japan

[73] Assignee: Denki Kagaku Kogyo Kabushiki Kaisha, Tokyo, Japan

[21] Appl. No.: 48,754

[22] Filed: May 12, 1987

[30] Foreign Application Priority Data

Jun. 10, 1986 [JP] Japan ................................ 61-132670
Aug. 8, 1986 [JP] Japan ................................ 61-185054

[51] Int. Cl.$^4$ ...................... B32B 9/04; C01B 31/00; C01B 41/81
[52] U.S. Cl. .................................. 428/408; 428/212; 428/220; 428/335; 264/29.6; 264/60; 264/65; 427/376.1

[58] Field of Search ............... 428/212, 219, 220, 408, 428/335; 423/445; 264/29.1, 29.6, 56, 60, 65; 501/99; 427/376.1

[56] References Cited

U.S. PATENT DOCUMENTS 3,854,979 12/1974 Rossi ................................ 428/408 X
4,135,038 1/1979 Tekami et al. ...................... 428/427
4,559,270 12/1985 Sare ...................................... 428/408

*Primary Examiner*—Ellis P. Robinson
*Assistant Examiner*—Susan S. Rucker
*Attorney, Agent, or Firm*—Keil & Weinkauf

[57] ABSTRACT

A glassy carbon-coated article contains a graphite substrate and a glassy carbon coating applied on the graphite substrate. The coating has a thickness of 15 to 200 microns. The glassy carbon is obtained by heating a raw material containing a thermal decomposition product of an organic polymer and a heat resistant inorganic substance. The difference of thermal expansion coefficient between the glassy carbon and the graphite substrate is not higher than $1.5 \times 10^{-6}/°C$.

8 Claims, No Drawings

GLASSY CARBON-COATED ARTICLE

BACKGROUND OF THE INVENTION

1. Field of the invention

This invention relates to a glassy carbon-coated article and a process for preparing the article.

The glassy carbon-coated article is superior in imperviousness to various gases and liquids and in chemical stability and hence it is used as a component material for semiconductor processing jigs, such as susceptors, graphite heaters or crucibles, that are employed in the production process for semiconductors.

2. Related Art Statement

Since the semiconductor processing jigs, such as susceptors, graphite heaters or crucibles are brought into contact with high purity semiconductors, it is required of these jigs to have the properties of not contaminating the semiconductors. It is also required of them to have etching resistant properties in a hydrogen chloride atmosphere at elevated temperatures as well as a sufficient thermal impact strength to withstand repeated usage at a temperature up to about 1200° C.

Since, the graphite heater used in the Czochralski method is heated to a temperature higher than 1600° C., impurities such as metals contained in the graphite tend to be vaporized to contaminate the semiconductor products, such as silicon semiconductor products.

For obviating this drawback, there has been used a coated article in which a molded product of carbon or ceramics is coated with silicon carbide by a chemical vapor deposition method, as disclosed for example in the Japanese Laid-Open Patent Publication No. 10921/1981.

However, since the thermal expansion coefficient of the silicon carbide of the coated article is different from that of the carbon or ceramic material, cracks tend to be formed in the coating under repeated heating cycles so that impurities tend to be exuded from the molded product of carbon or ceramics through these cracks to contaminate the processed semiconductor products.

For obviating these drawbacks, there has also been proposed a method for coating glassy carbon on a molded article of carbon or ceramics comprising mixing a decomposition product of an organic polymer and a solvent to obtain a slurry, applying the slurry to the surface of the molded article and heating the thus applied article to give a glassy carbon-coated article, as shown in the U.S. Pat. No. 3,854,979 and Japanese Patent Publication No. 39684/1977.

The glassy carbon-coated article obtained with this method has a number of advantages as compared with the aforementioned silicon carbide-coated article, for example, that it has a more uniform coating and a coating thickness of 10 microns which is thinner than that of the silicon carbide of about 100 microns, so that peeling or cracking is less likely to occur under repeated heating cycles.

However, when the glassy carbon-coated article is used for example as the susceptor, it is heated in a hydrogen atmosphere to an elevated temperature of not less than 1000° C. so that a hydrocarbon gas is evolved as a result of the reaction between the glassy carbon and hydrogen.

Since the glassy carbon coating is thin, the glassy carbon coating is consumed on prolonged usage, to expose the substrate graphite so that impurities are released from the graphite substrate to contaminate the semiconductor products.

When the thickness of the glassy carbon is increased to prevent the exposure of graphite, the glassy carbon coating cracks when forming the coating and tends to undergo peeling or cracking when the article is used under severe conditions such as rapid heating and cooling.

OBJECTS AND SUMMARY OF THE INVENTION

It is a principal object of the present invention to overcome these drawbacks of the prior art and to provide a glassy carbon-coated article which can withstand prolonged usage and free from peeling or cracking even when employed under conditions of rapid heating or cooling, and a process for producing the article.

It is another object of the present invention to provide a glassy carbon-coated article exhibiting superior imperviousness and being free from cracking upon production even when increasing the thickness of coating.

These and other objects of the invention will become apparent from the following description.

In accordance with the present invention, there is provided a glassy carbon-coated article comprising a graphite substrate and a glassy carbon coating applied on the graphite substrate and having a thickness of 15 to 200 microns, the glassy carbon being obtained by heating a raw material containing a thermal decomposition product of an organic polymer and a heat resistant inorganic substance, and the difference of thermal expansion coefficient between the glassy carbon and the graphite substrate being not higher than $1.5 \times 10^6/°C$.

In accordance with the present invention, there is also provided a process for the preparation of a glassy carbon-coated article comprising the steps of dissolving a thermal decomposition product of an organic polymer in a solvent to produce a solution, adding a heat resistant inorganic substance to the solution to form a slurry, affixing the slurry to a graphite substrate having a difference in the thermal expansion coefficient from the glassy carbon of not higher than $1.5 \times 10^{-6}/°C$., and heating the graphite substrate having the slurry affixed thereto.

DESCRIPTION OF THE INVENTION

The present invention will be hereafter explained in detail.

In the glassy carbon-coated article of the present invention, the difference in the thermal expansion coefficient between the glassy carbon forming the coating and the graphite substrate should be equal to or less than $1.5 \times 10^{-6}/°C$. With the difference in the thermal expansion coefficient between the glassy carbon and the graphite substrate in excess of $1.5 \times 10^{-6}/°C$., the article undergoes cracking and peeling in case of increasing the thickness of the glassy carbon coating and being used under severe conditions.

In the glassy carbon-coated article of the present invention, the thickness of the glassy carbon coating should be in the range of 15 to 200 microns. If the coating does not have the minimum thickness of 15 microns, the graphite substrate tends to be worn off so as to be exposed. With the coating thickness in excess of 200 microns, cracks are necessarily formed on rapid heating or cooling even if the difference in the thermal expansion coefficient is reduced to a value not higher than $1.5 \times 10^{-6}/°$ C.

With the thickness of the glassy carbon coating of not larger than 200 microns and the aforementioned difference in the thermal expansion coefficient of not higher than $1.5\times10^{-6}/°C.$, the coated article is completely free from occurrence of cracking or peeling.

According to the present invention, a thermal decomposition product obtained by thermal decomposition of an organic polymer is used as the raw material for the preparation of glassy carbon. Examples of the organic polymers include vinyl chloride resin, polyvinyl alchohol, oil-soluble phenol resin, alkyl phenol resin, chlorinated paraffin, chlorinated polypropylene, vinyl acetate resin and polycarbonate resin. Above all, when the usage and application of the coated article of the present invention is for the aforementioned jigs for processing semiconductor elements, the vinyl chloride resin is most preferred among the polymers in view of the small amount of impurities in these polymers.

The thermal decomposition of these organic polymers may preferably be conducted in such a manner that the polymers in the powdered or pelletized form is heated at 200° to 500° C. for at least 30 minutes in an inert atmosphere such as argon gas, no matter which kinds of the polymers is employed. The process of the thermal decomposition should be terminated before the organic polymer is completely carbonized. Although the heating temperature and time may vary depending on the heating equipment and the kind of the organic polymer employed, they may be determined by experiments so that the weight ratio of the carbon atoms to hydrogen atoms (C/H weight ratio) of the decomposition product be ultimately in the range of from 10 to 25:1.

The thermal decomposition product of the organic polymer thus produced is pitch-like and in the solid form at an ambient temperature. The thermal decomposition product of the organic polymer is then dissolved in a solvent to produce a solution, preferably with a concentration of 200 to 500 g/l. In view of solubility, the halogenated aliphatic solvents are preferred. Insoluble matter, if any, that is left in the solution is filtered off and removed.

The glassy carbon employed in the present invention is produced by heating the thermal decomposition product of an organic polymer as the raw material, as later described. It should be noted that a heat resistant inorganic substance should be further included in the raw material. By incorporating such an inorganic substance, cracks are not formed when heating the thermal decomposition product of an organic polymer to convert the same into glassy carbon. Examples of the heat resistant inorganic substances include carbonized products of organic polymers, graphite, silicon carbide or alumina. Above all, the carbonized product of an organic polymer which is the same as the organic polymer used as the thermal decomposition product is preferably used as the heat resistant inorganic substance, since then the inner structure of the coating layer becomes more homogeneous so as to improve imperviousness and resistance to cracking. It should be noted that the carbonized product is not necessarily in the completely carbonized state, but may contain part of hydrogen atoms remaining in its chemical structure in view that the glassy carbon may then adhere more intimately to the graphite substrate.

When employing the carbonized product of the organic polymer as the heat resistant inorganic substance, thermal decomposition may be carried out preferably at a temperature of not lower than 600° C. and more preferably in the range of from 800° to 1000° C. The heating time may usually be 1 to 2 hours. The heat resistant inorganic substance may be of any desired form, such as in the form of spheres or ellipsoids having a diameter preferably not larger than 50 microns and more preferably not higher than 20 microns. It may also be in the form of rods or fibers with the long diameter of not larger than 500 microns. The inorganic substance of this type may be obtained by any known method, such as crushing or pulverization. The heat resistant inorganic substance is admixed into the solution of the thermal decomposition product of the organic polymer to form a slurry. Although the amount of the heat resistant inorganic substance in the formed slurry may be varied depend upon its shape and particle size, it may be used in an amount of not larger than five times and more preferably not larger than twice by weight that of the thermal decomposition product of organic polymer in view that the amount of the heat resistant inorganic substance in excess of five times by weight gives rise to inconveniences such as lowered imperviousness or increased difficulties in uniform coating.

According to the present invention, the raw material including the thermal decomposition product of the organic polymer and the heat resistant inorganic substance is attached or affixed to the graphite substrate and the substrate with the raw material thus affixed thereto is heated. The graphite substrate having the difference in the thermal expansion coefficient of not larger than $1.5\times10^{-6}/°C.$ from that of the glassy carbon coating should be employed. The effect in preventing the formation of cracks or peeling will become nil in excess of the above critical value.

The thermal expansion coefficient of the graphite may be varied broadly within the range of $2\times10^{-6}$ to $6\times10^{-6}/°$ C., according to the graphite species. On the other hand, the thermal expansion coefficient of the glassy carbon coating is usually in the range of from $3\times10^{-6}$ to $4\times10^{-6}/°C.$, but it is changed slightly depending on the conditions for the preparation of the coating, such as the kind of the raw organic polymer or the heating conditions employed. Hence, it is usually preferred that the conditions for the preparation of the coating are determined first, the coefficient of thermal expansion of the coating produced under the aforementioned conditions is measured and the graphite species are selected that will have the coefficient of thermal expansion close to that of the coating. If the above defined difference in the thermal expansion coefficient cannot be attained solely by selecting a specific graphite substrate, a heat resistant inorganic substance having an appropriate thermal expansion coefficient such as silicon carbide having the coefficient of thermal expansion of $5.0\times10^{-6}/°C.$ may be admixed into the glassy carbon coating in an amount necessary to make the adjustment of the coefficient of thermal expansion of the coating. The aforementioned raw material is attached to the graphite which is selected in this manner and subsequently machined to a prescribed shape.

Any desired method such as ultrasonic impregnation, brushing, spraying or dipping may be employed for application of the coating on the graphite. After application of the coating, the graphite with the coating may be dried at a lower temperature of 50° to 100° C. As mentioned hereinabove, the thickness of the coating is critical and should be controlled to be in the range of 15 to 200 microns. It should be understood that such thickness is that of the coating which has undergone the heating step as later described. The coating thickness may be computed from the difference in weight of the coated graphite substrate before and after the application of the coating. The thickness of the coating layer may be increased in any desired manner a by repetition of the aforementioned application and drying, applying the slurry admixed with the heat resistant inorganic substance to an increased thickness, or by elevating the concentration of the solution of the thermal decomposition product of the organic polymer.

During heating, the thermal decomposition product of the organic polymer may preferably be heated to a temperature of 600° to 1300° C. in an inert atmosphere or in vacuum for longer than 30 minutes. This causes the thermal decomposition product of the organic polymer to be carbonized and forms a vitreous or glassy carbon. In case of coating the slurry to an increased thickness or elevating the concentration of the solution of the thermal decomposition product of the organic polymer, it is preferred that, in order to prevent foaming, the rate of temperature increase is slowed down slightly during heating.

EXAMPLES OF THE INVENTION

The present invention will now be described more specifically by referring to certain Examples. It is noted here that the following Examples are given by way of illustration only and the invention is not limited thereby in any sense.

EXAMPLES 1 to 8

Vinyl chloride resin (type SS-110 manufactured by Denki Kagaku Kogyo K.K.) was charged into a heating oven and heated at 390° C. for 90 minutes in an argon gas atmosphere to produce a thermal decomposition product.

The C/H weight ratio of the produced decomposition product was 12.5 as measured with a CHN Corder MT-3 manufactured by Yanagimoto Mgf. Co., Ltd. This heat decomposition product was divided into two portions, one of which was heated and carbonized at 1000° C. for 30 minutes under an argon atmosphere and crushed in a ball mill to a mean particle size of 5 microns so as to be used as the heat resistant inorganic substance.

The other portion of 500 g of the thermal decomposition product was dissolved in trichlene at a concentration of 500g/l and the heat resistant inorganic substance was added to the solution in varying amounts of from 20 g to 1000 g so as to be used as coating mother liquids. Each of these mother liquids were coated on each article having the ground surface (a graphite plate of 100 mm×100 mm×10 mm) by ultrasonic impregnation. The amounts of coating were computed from the change in weight of each of the articles. These amounts are shown in Table 1. After coating, the articles were dried at 60° C. In Examples 5 and 6, the operations of coating and drying were repeated in this order, as indicated in Table 1. The heating was performed in an inert atmosphere with a temperature increase rate of 15° C./min. up to 350° C., a temperature increase rate of 2° C./min. for a temperature range of 350° C. to 550° C., and with a temperature increase rate of 15° C./min. for a temperature range of 550° C. to 1000° C., and at 1000° C. for 30 minutes.

The glassy carbon-coated articles thus obtained were observed minutely by an optical microscope (magnification: 100) and a scanning electron microscope (SEM, magnification: 5000 at the maximum) to check the presence or absence of cracks and peeling. The gas permeability of some of the articles were also measured with a helium gas. The measured and observed data are shown in Table 1. As seen from this Table, the articles into which was incorporated the heat resistant inorganic substance exhibited good surface states and small values of gas permeability. In measuring the gas permeability, both sections of a chamber partitioned by a test piece were evacuated to vacuum of not higher than $10^{-7}$ Torr, and a helium gas of 1 atom. was passed through one of the sections of the chamber while the increase in pressure in the other section of the chamber was measured.

EXAMPLES 9 and 10

The same method and operating conditions as those shown in Examples 1 to 8 were followed except that the substances as indicated in Table 1 were used as the heat resistant inorganic substance in amounts indicated in Table 1 in place of using the carbonized product of the vinyl chloride resin. The results were favorable as indicated in Table 1. The silicon carbide employed was in the form of powders with a mean particle size of 1 micron while carbon whiskers were of a mean particle size of 1 micron and of the mean length of 100 microns.

COMPARATIVE EXAMPLES 1 to 3

The same method and operating conditions as those shown in Examples 4 to 6 were followed except that the heat resistant inorganic substance was not used. As shown in Table 1, cracks were observed on the surfaces of coatings of all the articles. As for the articles of comparative Examples 2 and 3 produced by repeatedly applying the raw material and drying, it was found that the coatings were peeled off.

From the results of Examples 5 and 6 in comparison with Comparative Examples 2 and 3, the articles in which the heat resistant inorganic substances were added maintained good surface conditions with number of times of application and drying being increased and with amounts of coatings being increased. On the contrary, as for the articles in which the heat resistant inorganic substance was not added, the amounts of coatings did not change even if number of times of application and drying was increased and the surface conditions became worse.

TABLE 1

| | Heat Resistant Inorganic Substance | Amount of Heat Resistant Inorganic Substance Added (%) relative to Decomposition Product of Organic Polymer | Number of Times of Application followed by Drying | Amount Applied $\left( \dfrac{mg}{cm^2} \right)$ | Product Characteristics | |
|---|---|---|---|---|---|---|
| | | | | | Gas Permiability $\left( \dfrac{10^{-9} \text{ ml He}}{atm \cdot cm^2 \cdot sec} \right)$ | Surface Condition |
| Ex. | | | | | | |
| 1 | Carbonized Polyvinyl Chloride | 4 | 1 | 4.8 | 10.5 | Possible to use, Fine cracks found |
| 2 | Carbonized | 5 | 1 | 5.3 | 5.0 | Good |

TABLE 1-continued

| | Heat Resistant Inorganic Substance | Amount of Heat Resistant Inorganic Substance Added (%) relative to Decomposition Product of Organic Polymer | Number of Times of Application followed by Drying | Amount Applied $\left(\dfrac{mg}{cm^2}\right)$ | Product Characteristics | | Surface Condition |
|---|---|---|---|---|---|---|---|
| | | | | | Gas Permiability $\left(\dfrac{10^{-9} \text{ ml He}}{\text{atm} \cdot cm^2 \cdot \text{sec}}\right)$ | | |
| 3 | Polyvinyl Chloride Carbonized | 10 | 1 | 5.9 | Not measured | | Good |
| 4 | Polyvinyl Chloride Carbonized | 40 | 1 | 6.7 | 1.8 | | Good |
| 5 | Polyvinyl Chloride Carbonized | 40 | 2 | 10.3 | Not measured | | Good |
| 6 | Polyvinyl Chloride Carbonized | 40 | 3 | 14.7 | below 0.1 | | Good |
| 7 | Polyvinyl Chloride Carbonized | 100 | 1 | 7.5 | Not measured | | Good |
| 8 | Polyvinyl Chloride Carbonized | 200 | 1 | 8.8 | 2.4 | | Good |
| 9 | Polyvinyl Chloride Silicon Carbide | 40 | 1 | 5.4 | 8.5 | | Good |
| 10 | Carbon Whisker | 20 | 1 | 5.5 | 4.0 | | Good |
| Comp. Ex. | | | | | | | |
| 1 | Not Used | | 1 | 3.5 | More than 1000 | | Cracks Found |
| 2 | Not Used | | 2 | 3.9 | Not measured | | Cracks and Peeling Found |
| 3 | Not Used | | 3 | 4.0 | Not measured | | Cracks and Peeling Found |

EXAMPLES 11 to 16

Graphite species having various thermal expansion coefficients as shown in Table 2 were prepared and processed into a plate form of 20 cm×50 cm×1 cm so as to be used as the graphite substrates.

Vinyl chloride resin SS-110 manufactured by Denki Kagaku Kogyo KK was subjected to an incomplete thermal decomposition in an argon atmosphere at 400° C. for 30 minutes to produce a thermal decomposition product which was then dissolved in trichlene in amounts at a rate indicated in Table 2. Alternatively, a part of the incomplete thermal decomposition product was heated and carbonized at 800° C. for 2 hours in an argon atmosphere followed by pulverization in a ball mill to obtain powders having a mean particle size of 2.2 microns. The powders were added to each of the solutions of the thermal decomposition products. The added amount was equal to the amount of the thermal decomposition product by weight.

For Example 15 only, powders of silicon carbide having a mean particle size of 10 microns were admixed into the solution in trichlene in addition to the carbonized powders.

The silicon carbide powders were admixed in an amount of 100 g per liter of trichlene.

The solution obtained in this manner was applied to the graphite substate by brushing. The number of times of brushing was in the range of from 1 to 10.

Each of the coated substrates obtained in this manner was heated at 1150° C. for 40 minutes to produce a glassy carbon-coated article. The thickness of each coating on the article is as indicated in Table 2. The thermal expansion coefficient of the glassy carbon coating not containing silicon carbide powders was $3.5 \times 10^{-6}/°C$. that of the coating containing silicon carbide powders (Example 15) was $4.1 \times 10^{-6}/°C$.

The produced coated articles were subjected to a repetition of cyclic operations of rapid heating and rapid cooling in vacuum at a temperature of from room temperature to 1150° C. up to 200 times at the maximum and the presence or absence of the cracking on the surface was checked by an optical microscope with a magnification factor of 100. As seen from the results shown in the Table 2, no cracking on the surface was seen to have occurred during the cyclic operations up to 200 times.

COMPARATIVE EXAMPLES 4 to 7

As shown in Table 2, the difference in the thermal expansion coefficient between each of the graphite substrates and each of the glassy carbon coatings was higher than $1.5 \times 10^{-6}/°C$. for the Comparative Examples 4, 6 and 7. The thermal expansion coefficient of the glassy carbon coating containing silicon carbide powders (Comparative Example 4) was $4.6 \times 10^{-6}/°C$. For Comparative Examples 5 and 7, the thickness of each of the glassy carbon coatings exceeded 200 microns.

Except as noted hereinabove, the glassy carbon-coated articles were produced and appraised by the same method and under the same conditions as in the Examples 11 to 14. As seen from the Table 2 showing the results, cracking was seen to occur at a relatively small number of times of the cyclic operations.

TABLE 2

| | | Thermal Expansion Coefficient of Graphite Substrate ($10^{-6}/°C$.) | Thermal Decomposition Product Dissolved in Trichlene (g/l) | Incorporation of Silicon Carbide | Number of Times of Application followed by Drying | Thickness of Coating (μm) | Thermal Expansion Coefficient of Glassy Carbon ($10^{-6}/°C$.) | Difference in Thermal Expansion Coefficient ($10^{-6}/°C$.) | Number of Times of Crack Occuring by Rapid Heating and Cooling |
|---|---|---|---|---|---|---|---|---|---|
| Ex. | 11 | 2.0 | 480 | No | 1 | 50 | 3.5 | 1.5 | More than 200 Times |
| | 12 | 3.0 | 300 | No | 2 | 60 | 3.5 | 0.5 | More than 200 Times |

TABLE 2-continued

| | | Thermal Expansion Coefficient of Graphite Substrate ($10^{-6}/°C$) | Thermal Decomposition Product Dissolved in Trichlene (g/l) | Incorporation of Silicon Carbide | Number of Times of Application followed by Drying | Thickness of Coating (μm) | Thermal Expansion Coefficient of Glassy Carbon ($10^{-6}/°C$) | Difference in Thermal Expansion Coefficient ($10^{-6}/°C$) | Number of Times of Crack Occuring by Rapid Heating and Cooling |
|---|---|---|---|---|---|---|---|---|---|
| | 13 | 4.0 | 200 | No | 10 | 200 | 3.5 | 0.5 | More than 200 Times |
| | 14 | 5.0 | 400 | No | 3 | 120 | 3.5 | 1.5 | More than 200 Times |
| | 15 | 5.5 | 500 | Yes | 1 | 50 | 4.1 | 1.4 | More than 200 Times |
| | 16 | 5.0 | 200 | No | 1 | 15 | 3.5 | 1.5 | More than 200 Times |
| Comp. Ex. | 4 | 2.0 | 300 | Yes | 3 | 90 | 4.6 | 2.6 | 20 Times |
| | 5 | 3.0 | 405 | No | 5 | 210 | 3.5 | 0.5 | 30 Times |
| | 6 | 5.5 | 200 | No | 5 | 100 | 3.5 | 2.0 | 3 Times |
| | 7 | 5.5 | 500 | No | 6 | 300 | 3.5 | 2.0 | 1 Time |

Although the present invention has been described with reference to the specific examples, it should be understood that various modifications and variations can be easily made by those skilled in the art without departing from the spirit of the invention. Accordingly, the foregoing disclosure should be interpreted as illustrative only and not to be interpreted in a limiting sense. The present invention is limited only by the scope of the following claims.

What is claimed is:

1. A glassy carbon-coated article comprising a graphite substrate and a glassy carbon coating applied on said graphite substrate and having a thickness of 15 to 200 microns, said glassy carbon being obtained by heating a raw material containing a thermal decomposition product of an organic polymer and a carbonized product of said organic polymer, the carbon atom/hydrogen atom weight ratio of said thermal decomposition product being 10 to 25:1, said carbonized product of said organic polymer being contained in an amount by weight not higher than 5 times that of said thermal decomposition product, and the difference of thermal expansion coefficient between said glassy carbon and said graphite substrate being not higher than $1.5 \times 10^{-6}/°C$.

2. A glassy carbon-coated article according to claim 1 wherein said organic polymer is selected from the group consisting of vinyl chloride resin, polyvinyl alcohol, oil-soluble phenol resin, alkyl phenol resin, chlorinated paraffin, chlorinated polypropylene, vinyl acetate resin and polycarbonate resin.

3. A glassy carbon-coated article according to claim 1 wherein said thermal decomposition product is obtained by heating for not less than 30 minutes in an inert atmosphere at a temperature of 200° to 500° C.

4. A glassy carbon-coated article according to claim 1 wherein said carbonized product is obtained by heating the organic polymer at a temperature not lower than 600° C. for not longer than two hours.

5. A process for the preparation of a glassy carbon-coated article comprising the steps of:
   dissolving a thermal decomposition product of an organic polymer in a solvent to produce a solution;
   adding a carbonized product of said organic polymer to said solution to form a slurry, said slurry containing 1 weight part of said thermal decomposition product and not higher than 5 weight parts of said carbonized product of said organic polymer;
   affixing said slurry to a graphite substrate having a difference in the thermal expansion coefficient from said glassy carbon of not higher than $1.5 \times 10^{-6}/°C$., and
   heating said graphite substrate having said slurry affixed thereto at 600° C. to 1300° C. for not less than 30 minutes in an atmosphere selected from an inert atmosphere and a vacuum.

6. A process according to claim 5 wherein the concentration of said solution is 200 to 500 g/l.

7. A process according to claim 5 further comprising an additional step of drying said graphite substrate after said step of affixing said slurry, again affixing said slurry to the thus coated substrate and drying the thus processed substrate, said additional step being performed at least once.

8. A process according to claim 7 wherein said drying is performed at 50° to 100° C.

* * * * *